April 22, 1969   W. H. MALONEY   3,440,605
RETRACTABLE CURB FEELER
Filed April 25, 1966
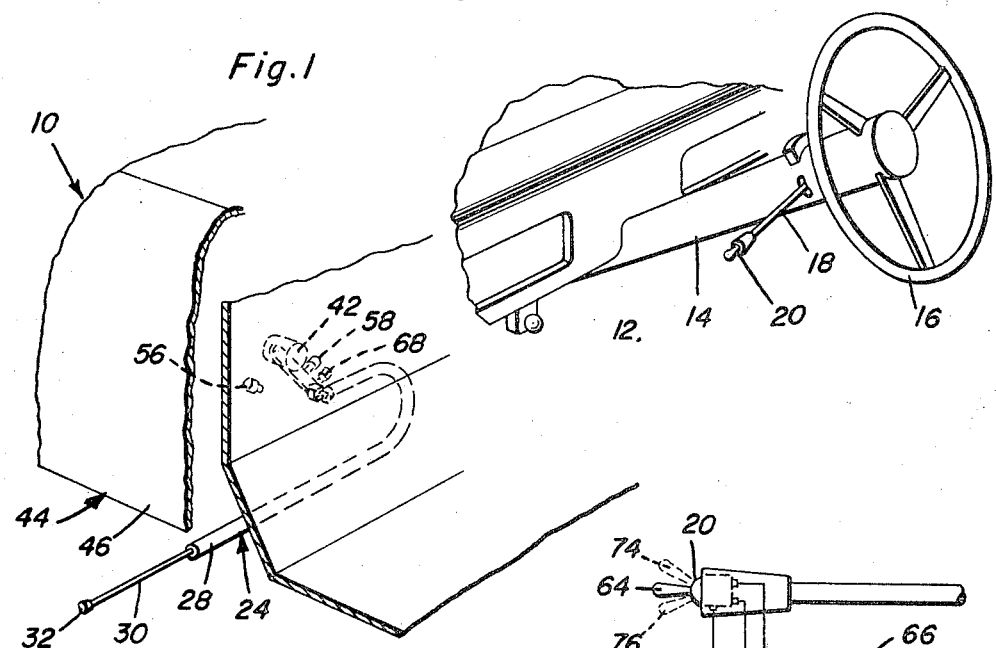
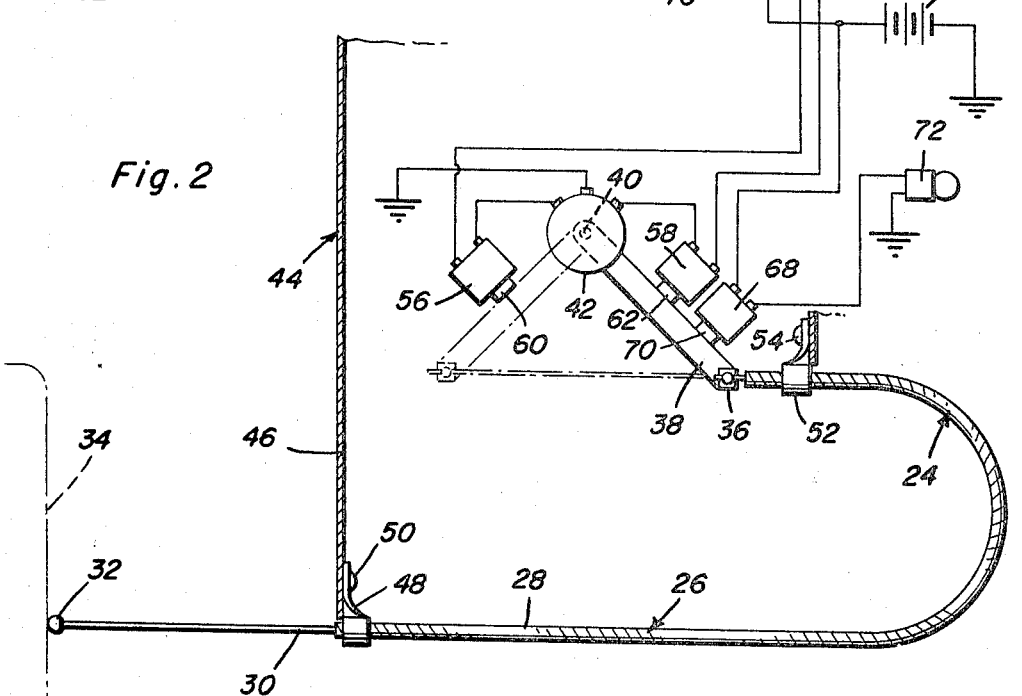
Walter H. Maloney
INVENTOR.
BY *Clarence A. O'Brien*
*and Harvey B. Jacobson*
Attorneys

United States Patent Office 3,440,605
Patented Apr. 22, 1969

3,440,605
RETRACTABLE CURB FEELER
Walter H. Maloney, 520 Ascot Ridge,
Rock Hill, S.C. 29730
Filed Apr. 25, 1966, Ser. No. 544,983
Int. Cl. B60q 5/00
U.S. Cl. 340—61                         3 Claims

ABSTRACT OF THE DISCLOSURE

An outer tubular guide structure having an elongated flexible feeler member disposed therein for longitudinal reciprocation between limit positions with one end of the feeler member extending and retracted relative to the corresponding end of the guide structure and a motor is drivingly connected between the tubular guide and the feeler member for shifting the latter between its limit positions. A main control is provided and operable to effect operation of the motor and the main control includes a secondary control operative to terminate operation of the motor in either direction and, upon the feeler member being shifted to one limit position, to cause the motor to operate in the opposite direction next time the main control is actuated.

---

This invention relates to a novel and useful retractable curb feeler and more specifically to a curb feeler comprising an improvement over conventional curb feelers which are quite often secured to the lower marginal edge portion of the front and/or rear fenders of the curb side of the vehicle and utilized to engage the curb and vibrate therealong in a manner transmitting the sound of the vibration through the body of the vehicle in order that the sound may be heard by the operator of the vehicle.

Conventional curb feelers comprise elongated flexible members which project outwardly from an associated vehicle and have their inner end secured to body portions of the vehicle in a manner such that vibration of the outer end of the curb feeler is readily transmitted to the body of the associated vehicle. However, the present forms of curb feelers are considered unsightly by some persons and quite often interfere with a washing of the associated vehicle by means of automatic car washing machinery such as that utilized in a "car wash."

Accordingly, it is the main object of this invention to provide a curb feeler which is retractable and which may be readily extended between a substantially fully retracted position projecting no more than slightly outwardly beyond the adjacent portions of the associated vehicle body and an extended position projecting outwardly of the body at least several inches for engagement with the associated vehicle.

Another object of this invention, in accordance with the immediately preceding object, is to provide a retractable curb feeler including readily controllable motor means operable from a remote location such as the driver's compartment of an associated vehicle whereby the retractable curb feeler may be readily extended and retracted by the driver of a vehicle.

A further object of this invention is to provide a retractable curb feeler including means by which a signal may be given to the driver of the vehicle to indicate when the curb feeler is extended.

A final object of this invention to be specifically enumerated herein is to provide a retractable curb feeler in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a conventional form of motor vehicle with portions thereof being broken away and illustrated in vertical section and with the retractable curb feeler of the instant invention operatively associated therewith; and FIGURE 2 is a diagrammatical view of the retractable curb feeler operatively associated with the side of the associated vehicle, portions of the latter being illustrated in transverse vertical section.

Referring now more specifically to the drawings the numeral 10 generally designates a conventional form of motor vehicle including a driver's compartment 12. The driver's compartment 12 includes the usual steering column 14 supporting a steering wheel 16 at its upper end and including a turn signal actuating lever 18. The outer end portion of the lever 18 includes a switch 20 whose purpose is to be hereinafter more fully set forth.

The retractable curb feeler of the instant invention is generally designated by the reference numeral 24 and includes a cable assembly generally referred to by the reference numeral 26. The assembly 26 comprises an outer tubular section 28 and an inner flexible rod-like section 30, the opposite ends of the section 30 projecting outwardly of the opposite ends of the tubular section 28. If it is desired, the cable assembly 26 may be in the form of a modified Bowden cable assembly. One end of the section 30 is provided with an enlargement 32 for engagement with an associated curb 34 and the other end of the section 30 has an anchor assembly 36 secured thereto which is pivotally supported from a free end portion of a lever arm 38. The end of the lever arm 38 remote from the anchor assembly 36 is mounted on an oscillatable output shaft 40 of a reversible electric motor assembly 42, the latter being supported from the body assembly 44 of the vehicle 10 in any convenient manner.

One end of the tubular section 28 is supported from the front fender 46 of the body assembly 44 in any convenient manner such as by a suitable clamp assembly 48 secured to the fender 46 by means of a fastener 50 and the other end of the tubular section 28 is also supported from the body assembly 44 by means of a similar clamp assembly 52 secured to the body assembly 44 by means of a suitable fastener 54.

A pair of switches 56 and 58 are supported from the body assembly 44 in any convenient manner for engagement of the actuators 60 and 62 thereof by the lever arm 38 in its limit positions of movement illustrated in phantom and solid lines in FIGURE 2. The switch 20 includes a three-position actuator 64 and the switches 20, 56 and 58 are electrically connected to a suitable source 66 of electrical potential by means of suitable wiring. In addition, a fourth switch 68 is also supported from the body assembly 44 in any convenient manner and includes an actuator 70 engageable by the lever arm 38 when the latter is positioned as illustrated in phantom lines in FIGURE 2 of the drawing with the end of the section 30 remote from the lever arm 38 extended. The switch 68 is also electrically connected to the source 66 and also to a visual and electrically operated signal assembly 72.

Upon movement of the switch actuator 64 to the position 74 illustrated in phantom lines in FIGURE 2, the electric motor 42 will be actuated to cause the lever arm 38 to swing from the phantom line position illustrated in FIGURE 2 to the solid line position of FIGURE 2 in which position the lever arm 38 engages the actuator 62 to open the switch 58 and thereby cease operation of the electric motor 42. In addition, the lever arm 38 also engages the actuator 70 to close the switch 68 thereby effecting operation of the signal means 72. When the lever arm 38 is positioned as illustrated in solid lines in FIGURE 2 of the drawings, the section 30 is extended for engagement with the curb 34.

When it is desired to retract the section 30, the actuator 64, which is spring-urged toward the neutral solid line position illustrated in FIGURE 2, is moved to the dotted line position 76 in FIGURE 2 actuating the motor 42 to swing the lever arm 38 from the solid line position of FIGURE 2 to the phantom line position of FIGURE 2 so as to retract the section 32. In addition, when the section 30 is substantially fully retracted, the lever arm 38 is positioned as illustrated in phantom lines in FIGURE 2 of the drawings and contacts the switch actuator 60 thereby opening the switch 56 and terminating operation of the electric motor 42. Of course, as the lever arm 38 is initially shifted from the solid line position of FIGURE 2 to the dotted line position of FIGURE 2, it moves from engagement with the actuator 70 and thereby causes the switch 68 to be opened resulting in termination of operation of the signal means 72.

When the section 30 is fully retracted, the enlargement or terminal end portion 32 is disposed immediately adjacent the clamp assembly 48 and in this manner the section 30 of the curb feeler 24 is stored in an unobtrusive and inoperative manner.

Although the curb feeler 24 is illustrated and described herein as including an electric motor, it is to be noted that any suitable means, either manual or some other type of motor, may be utilized to longitudinally shift the section 30 relative to the section 28. Still further, deluxe installations of the curb feeler 24 are contemplted wherein the section 30 could be mounted from the associated vehicle in a manner such that it is completely retractable within a suitable recess provided therefor in the body assembly 44 in a manner similar to the manner in which retractable radio aerials of some higher priced passenger cars are completely retractable relative to the body portions from which they are supported.

What is claimed as new is as follows:

1. In combination, a land vehicle, a retractable curb feeler comprising guide means including a portion supported from said vehicle, and elongated flexible feeler means having one end portion guidingly engaged with and supported from said guide means and longitudinally shiftable and therefore extendable relative to and outwardly of said guide means, motor means drivingly connected to said feeler means for shifting the latter relative to said guide means between said retracted and extended positions, said motor means being reversible, main control means operatively connected to said motor means for effecting operation of the latter, said control means including secondary control means operative to terminate operation of said motor means in either diretcion, upon initial actuation of said main control means, and upon said feeler means being shifted to the corresponding position and to cause said said motor means to operate in the opposite direction the next time said main control means is actuated.

2. The combination of claim 1 including signal means operatively associated with said flexible member for rendering a visual signal when said one end portion of said feeler means is in said extended position.

3. The combination of claim 2 wherein said guide means comprises a hollow tubular member having at least one end thereof supported from said vehicle, said feeler means having at least said one end portion thereof disposed within said one end of said tubular member and extendible and retractable relative thereto, the other end portion of said feeler means projecting outwardly of said tubular member and being adapted to be longitudinally shifted from a remote location.

References Cited

UNITED STATES PATENTS 2,334,849  11/1943  Toney.

ALVIN H. WARING, *Primary Examiner.*

U.S. Cl. X.R.

340—282; 200—61.44